(12) United States Patent
Lewis

(10) Patent No.: US 9,156,385 B1
(45) Date of Patent: Oct. 13, 2015

(54) ADJUSTABLE ARM REST AND METHODS OF MANUFACTURE AND USE THEREOF

(71) Applicant: Honda Motor Co., Ltd., Tokyo (JP)

(72) Inventor: Daniel R. Lewis, Troy, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 57 days.

(21) Appl. No.: 14/266,473

(22) Filed: Apr. 30, 2014

(51) Int. Cl.
*A47C 7/54* (2006.01)
*B60N 2/46* (2006.01)

(52) U.S. Cl.
CPC ............ *B60N 2/4606* (2013.01); *B60N 2/4633* (2013.01)

(58) Field of Classification Search
CPC ........ A47C 1/03; A47C 7/543; B60N 2/4606; B60N 2/4633
See application file for complete search history.

(56) References Cited

U.S. PATENT DOCUMENTS

| | | | | |
|---|---|---|---|---|
| 4,848,840 | A * | 7/1989 | Toya | B60N 2/4606 297/335 |
| 4,946,226 | A | 8/1990 | Hurn et al. | |
| 5,658,043 | A * | 8/1997 | Davidson | B60N 2/4606 297/113 |
| 5,984,416 | A | 11/1999 | Waldo et al. | |
| 6,328,384 | B1 * | 12/2001 | Yamauchi | B60N 2/4606 297/411.29 |
| 6,467,847 | B2 * | 10/2002 | Bidare | B60N 2/4633 297/411.3 |
| 6,883,871 | B2 | 4/2005 | Nae et al. | |
| 8,177,301 | B2 * | 5/2012 | Saito | A47C 7/543 297/411.32 |
| 8,328,286 | B2 * | 12/2012 | Steury | B60N 2/22 297/411.39 |
| 2013/0015692 | A1 * | 1/2013 | Saito | B60N 2/4633 297/411.2 |

FOREIGN PATENT DOCUMENTS

| | | |
|---|---|---|
| DE | 3636223 A1 | 5/1988 |
| DE | 196 18 608 C1 | 11/1997 |
| DE | 10 2008 014 891 A1 | 9/2009 |
| FR | 2 791 305 A1 | 9/2000 |

* cited by examiner

*Primary Examiner* — Philip Gabler
(74) *Attorney, Agent, or Firm* — Kenealy Vaidya LLP

(57) ABSTRACT

Some embodiments are directed to an adjustable arm rest attachment mechanism that includes an outer bearing non-rotatably fixed to a seat and defining a first guide groove. An inner bearing is non-rotatably fixed to an arm rest, and defines a second guide groove. The inner bearing is rotatable relative to the outer bearing, and is disposed over the outer bearing. A pin extends through the second guide groove and into the first guide groove. The pin and the first and second guide grooves are configured such that, if the arm rest is rotated downward within an adjustment zone, then wall surfaces of the first guide groove selectively engage and disengage the pin, and simultaneously, wall surfaces of the second guide groove selectively engage and disengage the pin, thereby creating a varying frictional force capable of impeding further rotation of the arm rest.

20 Claims, 13 Drawing Sheets

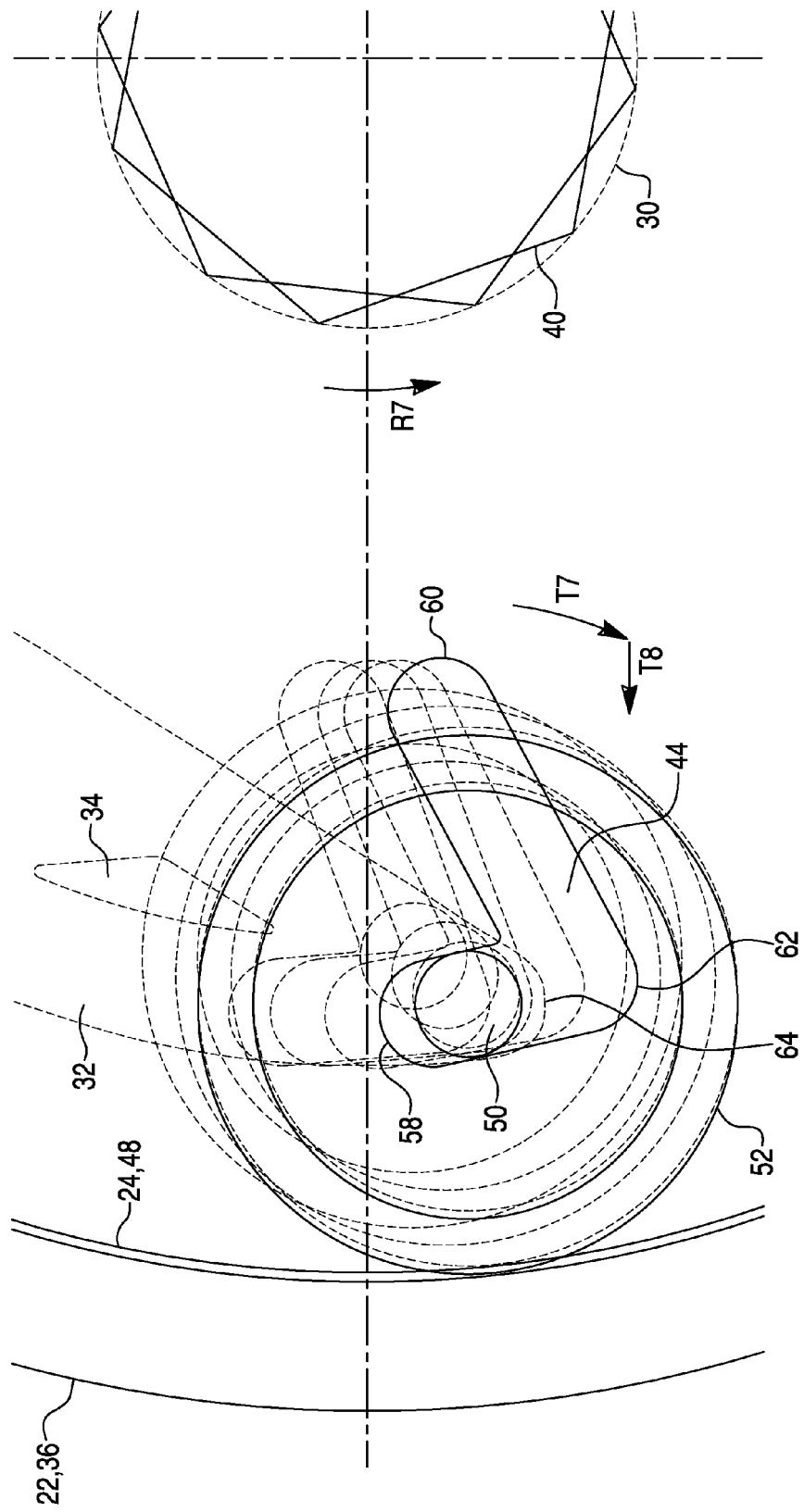

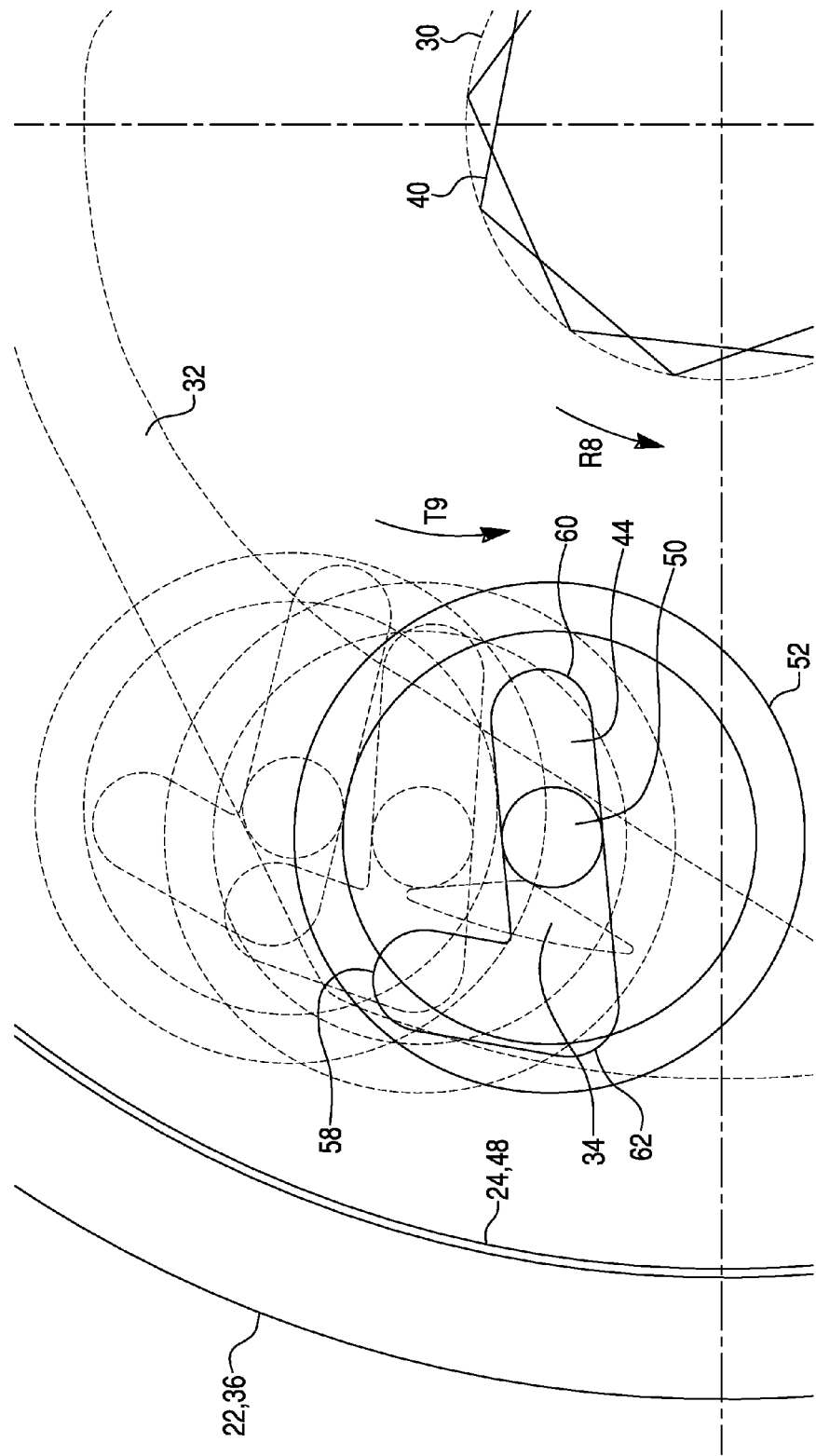

ADJUSTABLE ARM REST AND METHODS OF MANUFACTURE AND USE THEREOF

BACKGROUND

The disclosed subject matter relates to adjustable arm rests, and methods of manufacture and use thereof, including but not limited to arm rests for use with seats. More particularly, the disclosed subject matter relates to arm rests that are adjustable in terms of orientation relative to an occupant of the seat.

Some related art seats include arm rests that are movable between a deployed state that can support a user's arm, and a stowed position that does not enable support of the user's arm. Some of these and other related art seats allow a user to manually adjust a lowest position of the arm rest in the deployed state, which is referred to herein as the maximum deployment position or full down position. This adjustment of the maximum deployment position can be performed by a related art rotatable knob, wherein rotation of the knob adjusts the maximum deployment position, or alternatively by a related art tightening coil that provides one-way locking or ratcheting of the arm rest.

SUMMARY

However, the related art adjustment mechanisms are subject to various disadvantages. For example some of the related art adjustment mechanisms include a relatively large number of separate parts, are relatively complicated, are relatively large in size, are difficult to use, are relatively ineffective, and/or are subject to other disadvantages. Some of the related art adjustment mechanisms are particularly disadvantageous based on their inclusion of springs and/or other flexible parts, which may be expensive to control during manufacturing.

It may therefore be beneficial to provide an adjustable arm rest, and methods of manufacture and use thereof, that address at least one of the above and/or other disadvantages of the related art. In particular, it may be beneficial to utilize static friction to impede or prevent reorientation of the arm rest, and to thereby lock the arm rest at a desired position. For example, it may be beneficial to perform such locking as the arm rest is being moved within an adjustment region, which includes positions that enable support of the user's arm, toward the full down position. It may also be beneficial to perform this locking by using parts, including moving parts, that are solid and/or rigid, which enhances ease of manufacture and control.

Some embodiments are directed to an adjustable arm rest attachment mechanism for use with a seat and an arm rest that is configured to support an arm of an occupant of the seat in a position within an adjustment zone. The seat can include a seat frame and the arm rest can include an arm rest support member. The adjustable arm rest attachment mechanism can include an outer bearing that is non-rotatably fixed to the seat frame and that defines a first guide groove. An inner bearing can be non-rotatably fixed to the arm rest support member, and define a second guide groove. The inner bearing can be rotatable relative to the outer bearing, and disposed over the outer bearing, such that at least a portion of the second guide groove overlaps at least a portion of the first guide groove. A pin can extend through the second guide groove and into the first guide groove. The pin and the first and second guide grooves can be configured such that, if the arm rest is rotated downward in the adjustment zone, then wall surfaces of the first guide groove selectively engage and disengage the pin, and simultaneously wall surfaces of the second guide groove selectively engage and disengage the pin, thereby creating a varying frictional force capable of impeding further rotation of the arm rest.

Some other embodiments are directed to a seat, for use with a vehicle and a seat occupant, that includes a seat frame, and an arm rest that is configured to support an arm of the seat occupant in a position within an adjustment zone. The arm rest includes an arm rest support member. The seat can also include an adjustable arm rest attachment mechanism. The adjustable arm rest attachment mechanism can include an outer bearing that is non-rotatably fixed to the seat frame and that defines a first guide groove; an inner bearing that is non-rotatably fixed to the arm rest support member and that defines a second guide groove, the inner bearing being rotatable relative to the outer bearing and being disposed over the outer bearing such that at least a portion of the second groove overlaps at least a portion of the first groove; and a pin that extends through the second guide groove and into the first guide groove. The pin and the first and second guide grooves can be configured such that, if the arm rest is rotated downward in the adjustment zone, then wall surfaces of the first guide groove selectively engage and disengage the pin, and wall surfaces of the second guide groove simultaneously and selectively engage and disengage the pin, thereby creating a varying frictional force capable of impeding further rotation of the arm rest.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 13 is a kinematic representation of a portion of the full range of motion of the adjustable arm rest mechanism of FIG. 3, including locking in the full down position.

FIG. 14 is a kinematic representation of a portion of the full range of motion of the adjustable arm rest mechanism of FIG. 3, including movement from the unrestricted zone toward the full down position, bypassing the stowed position.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

1. Seat

Figure 1:
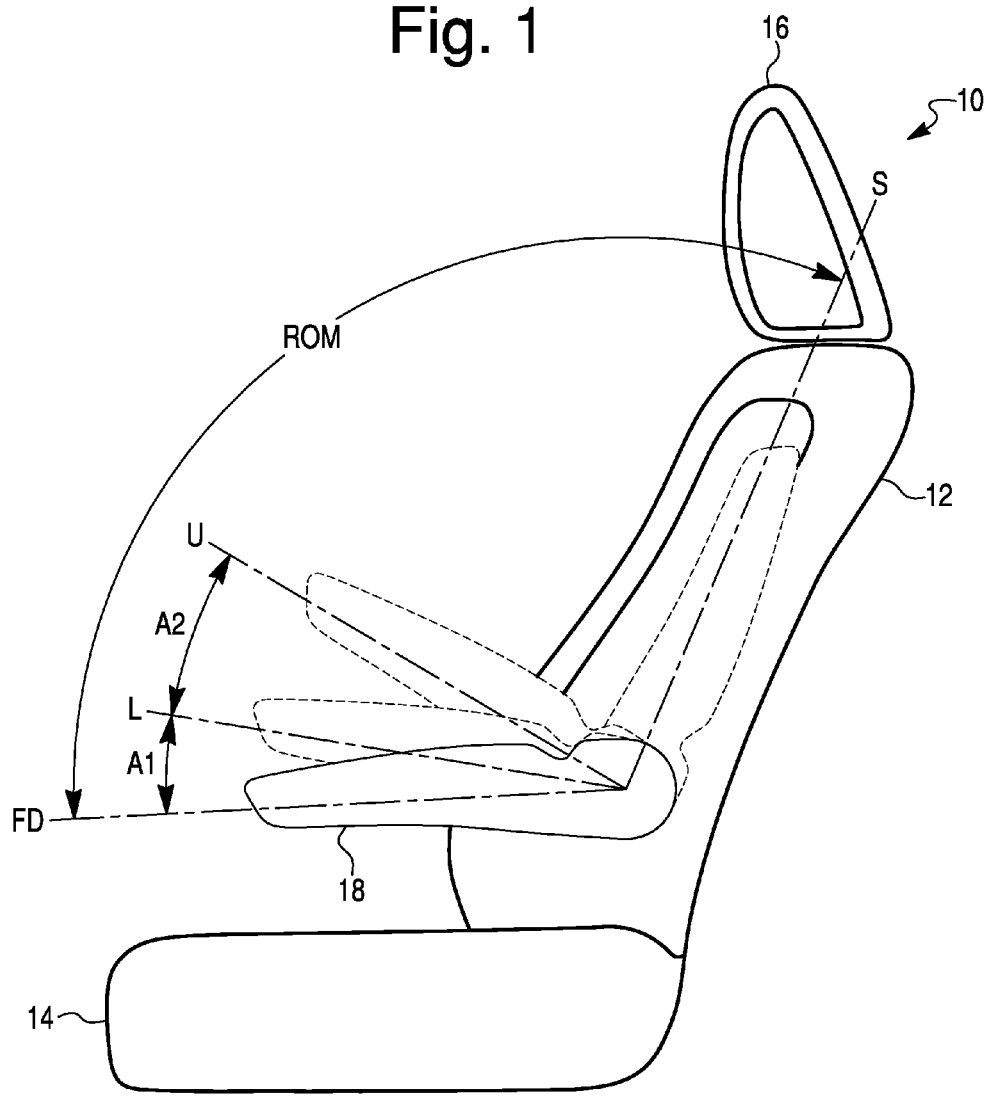
FIG. 1 is a side view of an exemplary vehicle seat in accordance with the disclosed subject matter.

FIG. 1 is a side view of an exemplary seat 10 in accordance with the disclosed subject matter. Many of the disclosed embodiments are directed to a vehicle seat 10 that can be used in a vehicle, such as but not limited to a passenger car, truck, all-terrain vehicle (ATV), aircraft, personal watercraft, boat, semi-tractor and off-highway vehicle. However, embodiments are intended to include or otherwise cover any type of seat 10 capable of supporting an occupant, including seats not associated with vehicles.

In the exemplary embodiment shown in FIG. 1, the vehicle seat 10 includes a seat back 12, a seat bottom 14, a head rest 16, and at least one arm rest 18. Each of these elements can include various sub-elements. For example, the seat back 12 can include a frame, padding and a cover. The padding and the cover can be attached the frame to constitute the completed seat back 12 shown in the exemplary embodiment of FIG. 1.

However, embodiments are intended to include any type of seat, and thus some other embodiments are directed to seats that include only one or any combination of these elements, and/or alternative elements. In fact, some embodiments only include an arm rest 18, such as an arm rest connected to a static object and disposed appropriately to support a user's arm in a deployed state while the user is in a seated position. Still further, some embodiments include such an adjustable arm rest that is disposed to support a user's arm in a deployed state while the user is not in a seated position, such as in the case of a user standing up, lying down, etc.

2. Arm Rest & Adjustable Arm Rest Mechanism

Figure 2:
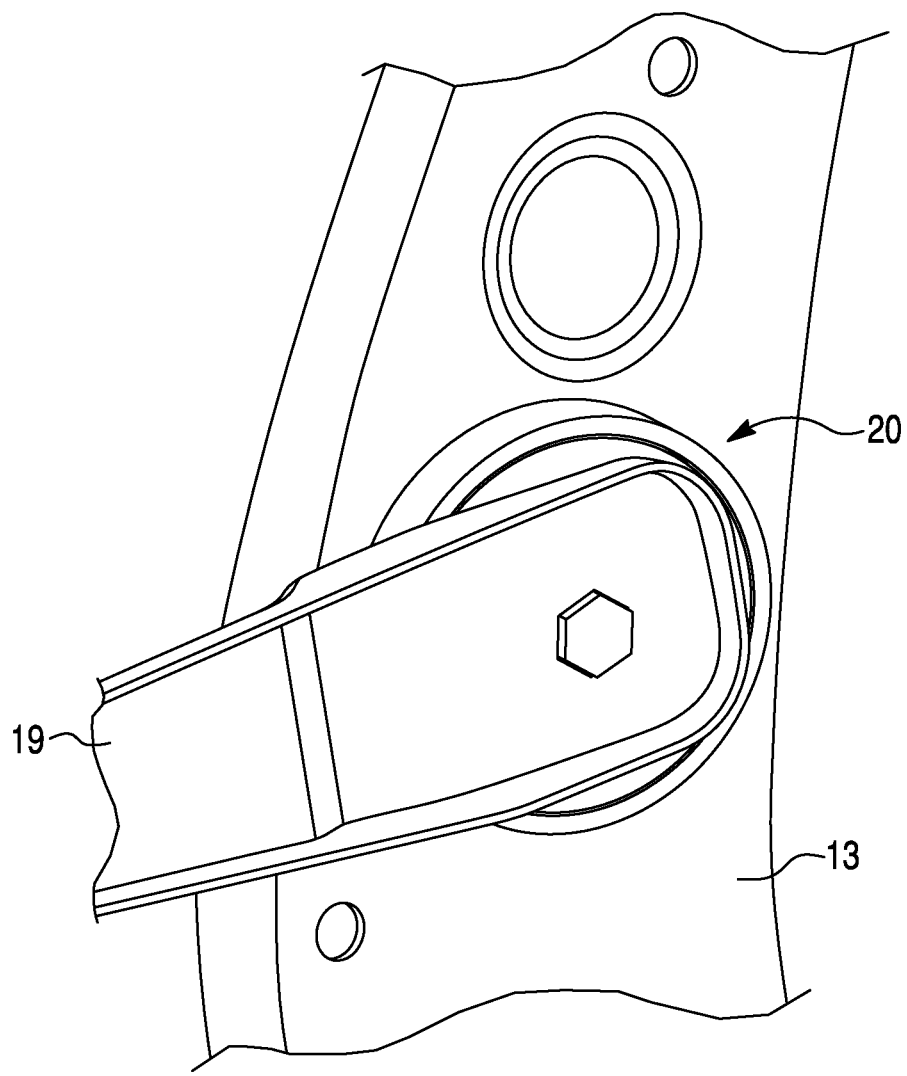
FIG. 2 is a perspective view of internal structures of the exemplary vehicle seat of FIG. 1.

FIG. 2 is a perspective view of internal structures of the exemplary vehicle seat 10 of FIG. 1, including an adjustable arm rest attachment mechanism 20 (hereinafter arm rest mechanism) that attaches the arm rest 18 directly or indirectly to other elements of the seat 10. Embodiments are intended to include or otherwise cover many different types of apparatus or methods for attaching the arm rest 18 to other elements of the seat 10, some of which are disclosed below. In some embodiments, the arm rest 18 is attached by the arm rest mechanism 20 to at least one frame member 13 of a seat back frame of the seat back 12.

As explained in greater detail below, the adjustable arm rest mechanism 20 permits a seat occupant to adjust the orientation of the arm rest 18 relative to certain elements of the seat 10 and/or the seat occupant, and in particular enables adjustment of the arm rest 18 within an adjustment region of a deployed state. As used in the present disclosure, the adjustment region constitutes a region of the deployed state in which the arm rest 18 is able to support the arm of a seat occupant. The adjustment region includes a full down position (hereinafter FD), which constitutes the lowermost position of the arm rest 18. The disclosed arm rest mechanism 20 enables adjustment of the arm rest 18 between the full down position FD and at least one other position within the adjustment region.

Some of these embodiments utilize static friction to impede or prevent further reorientation of the arm rest 18, to thereby lock the arm rest 18, upon being moved within the adjustment region toward the full down position FD. Still further, some of these embodiments enable this adjustment via a relatively simple mechanism and/or by utilizing a relatively small number of separate parts. In many of the disclosed embodiments, the arm rest mechanism 20 is manually adjustable, such as by the seat occupant; however other embodiments include or otherwise cover mechanisms that are partially or completely automated.

The arm rest 18 can include a support member 19, padding and a cover. The padding and the cover can be attached to the support member 19 to provide the completed arm rest 18 shown in the exemplary embodiment of FIG. 1. The support member 19 can be pivotally connected to the frame member 13 of the seat back 12 by the arm rest mechanism 20.

3. Range of Motion of Arm Rest

In some embodiments, the adjustable arm rest mechanism 20 can permit the arm rest 18 to pivot through a full range of angular motion extending between the full down position FD within the adjustment zone and a stowed position (hereinafter S). In the stowed position S, the arm rest 18 does not enable support of the user's arm, and instead is disposed relative to other elements of the seat 10 to generally not impede typical movements of the user's arm while seated. In some of these embodiments, the direction of elongation of the arm rest in the stowed position S is approximately or very generally perpendicular to various positions of the arm rest within the adjustment zone, and thus extends generally parallel to a side surface of the seat back 12.

The arm rest mechanism 20 can be configured to enable the arm rest 18 to be infinitely variable between various positions within the adjustment zone. The arm rest 10 can be rotatable, such that the stowed position S is angularly spaced from the full down position FD by a range of motion or range angle (hereinafter ROM). The range angle ROM can be set at any appropriate value in order to meet the performance desired for the particular arm rest 18.

Embodiments are intended to include or otherwise cover arm rests having a range of motion that includes any number of separately defined zones. In some embodiments, the full range of motion includes the adjustment zone and an unrestricted zone. The adjustment zone constitutes multiple arm rest 18 positions in which a seat occupant's arm can be supported by the arm rest 18, and can extend from the full down position FD to an upper position (hereinafter U). As discussed in detail below in the context of locking the arm rest 18, the adjustment zone also includes a lower position (hereinafter L) that is between the upper position U and the full down position FD. The unrestricted zone can extend from the upper position U to a position at or adjacent the stowed position S.

In an exemplary embodiment, the adjustable arm rest mechanism 20 can permit the seat occupant to set the arm rest 18 to stop or otherwise be locked at the full down position FD, or at any continuously variable position between and including the upper position U and the lower position L as the arm rest 18 moves toward the full down position. In other words, in these embodiments, the arm rest 18 cannot be stopped or otherwise locked between the lower position L and the full down position FD as the arm rest 18 moves toward the full down position FD, and instead this stopping or locking is only provided between the upper position U and the lower position L as the arm rest 18 moves toward the full down position FD. In addition, the arm rest 18 cannot be stopped or otherwise locked within the unrestricted zone.

Embodiments are intended to include or otherwise cover arm rests 18 and arm rest mechanisms 20, wherein the lower position L is disposed at any location between the upper position U and the full down position FD. In many embodiments, the lower position L is closer to the full down position FD than the upper position U, which is beneficial because it provides the user with a relatively large number of arm rest positions in which the arm rest can be locked in place. However, the lower position L can be intermediate the full down position FD and the upper position U, or even closer to the upper position U than the full down position FD. The lower position L can be spaced from the full down position FD by a first angle A1, and the upper position U can be spaced from the lower position L by a second angle A2. The first angle A1 and the second angle A2 can be set at any appropriate value in order to meet the performance desired for the arm rest 18. In the exemplary embodiment of FIG. 1, the first angle A1 is less than the second angle A2 to provide a relatively large number of positions in which the arm rest can be held in place.

4. Adjustable Arm Rest Mechanism Components

Figure 3:
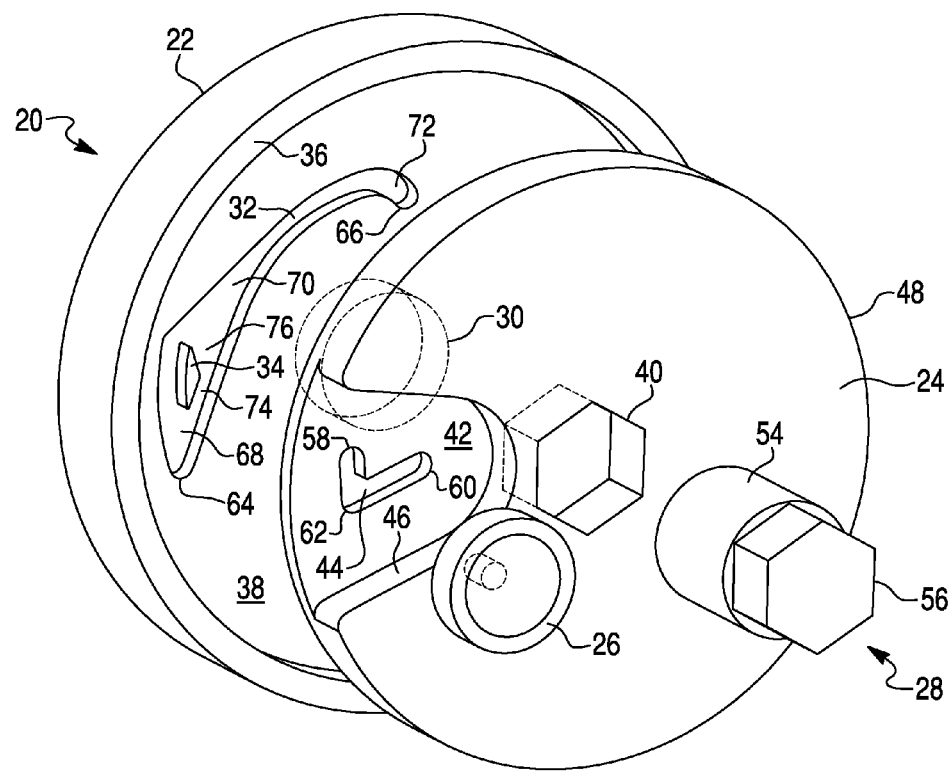
FIG. 3 is an exploded perspective view of an exemplary adjustable arm rest mechanism in accordance with the disclosed subject matter.

FIG. 3 is an exploded perspective view of an exemplary adjustable arm rest mechanism 20. The adjustable arm rest mechanism 20 of FIG. 3 can include a first coupling structure 22, a second coupling structure 24, an adjustment structure 26 and a shaft 28. The first coupling structure 22 can be non-rotatably fixed to the frame member 13 of the seat 10, and the second coupling structure 24 can be non-rotatably fixed to the support member 19 of the arm rest 18, such as by the shaft 28.

The shaft 28 and the second coupling structure 24 can rotate relative to the first coupling structure 22 if the arm rest 18 pivots between the full down position FD and the stowed position S. As explained in detail below, movement of the second coupling structure 24 relative to the first coupling structure 22 can displace the adjustment structure 26 relative to both of the first and second coupling structures 22, 24, and this displacement permits the seat occupant to adjust the stopping position of the arm rest 18 if the arm rest 18 pivots among certain positions within the adjustment zone, i.e., between the upper position U and the lower position L.

The first coupling structure 22 can be characterized as an outer bearing that is rotationally constrained relative to an appropriate internal structure of the seat back 12, e.g., the frame member 13. In the exemplary embodiment of FIG. 2, the first coupling structure 22 can be non-movably fixed to, or otherwise statically disposed relative to, the frame member 13 of the seat back 12. As shown in FIG. 3, the first coupling structure 22 can include a through hole 30, a first guide structure 32, an island structure 34 and an annular rim 36.

The shaft 28 is non-rotatably connected to the arm rest, such as at the support member 19, and can include different integrally or unitarily formed elements, or alternatively separately formed elements that are connected together. For example, the shaft 28 can include a first portion 54 for disposition proximate the first coupling structure 22, and which can include a consistent arcuate outer surface along its perimeter to thereby define a circular cross-section. The shaft 28 can also include a second portion 56 adjacent the first portion 54 for disposition proximate the second coupling structure 24, and which defines an irregular outer surface. In the embodiment of FIG. 3, the second portion 56 is polygonal in cross-section, and in particular is hexagonal.

The through hole 30 can be configured to receive the first portion 54 of the shaft 28, such that the shaft 28 can rotate freely within the through hole 30. In some embodiments, the through hole 30 is configured to rotatably support the first portion 54 of the shaft 28. In an alternate embodiment, the shaft 28 can be spaced apart from the inner surface of the through hole 30, such that the first portion 54 does not contact the inner surface of the through hole 30, and can be rotatably supported by the frame member 13 or other appropriate internal structure of the seat back 12. In fact, embodiments are intended to include or otherwise cover any apparatus and method for attaching the shaft 28 to the seat 10 to enable rotation thereof.

The first guide structure 32 can be formed as a groove in a recessed face 38 of the first coupling structure 22, such that the first guide structure 32 is spaced inwardly from the annular rim 36. In the embodiment shown in FIG. 3, a portion of the first guide structure 32 extends across the recessed face 38, between the annular rim 36 and the through hole 30. The first guide structure 32 can have a contoured shape of any geometry that can provide the performance desired for the arm rest 18. In the exemplary embodiment of FIG. 3, the first guide structure 32 can include a plurality of arcuate paths and linear paths.

The second coupling structure 24 can be characterized as an inner bearing that is rotationally constrained relative to the appropriate internal structure of the arm rest, e.g., the support member 19. The second coupling structure 24 can include a through hole 40, a recessed portion 42, a second guide structure 44, a recessed side wall 46 and an outer surface 48. The recessed face 38 of the first coupling structure 22 can be configured to receive the second coupling structure 24 so that the second coupling structure 24 is slideable on or over the recessed face 38. The outer surface 48 of the second coupling structure 24 can be configured to mate, or otherwise communicate with, the inner wall of the annular rim 36 of the first coupling structure 22, thereby enabling the annular rim 36 to guide the second coupling structure 24 to slide in a rotational manner on or over the recessed face 38. In other words, the recessed face 38 and annular rim 36 define a space that receives the second coupling structure 24, to enable the second coupling structure 24 to be rotatable relative to the first coupling structure 22.

The shaft 28 can be non-rotatably fixed to each of the second coupling structure 24 and the support member 19 of the arm rest 18 in any appropriate manner. As a result, the second coupling structure 24 and the shaft 28 can rotate about the axis of the shaft 28 as the arm rest 18 pivots, such as between the full down position FD and the stowed position S. In an exemplary embodiment, a through hole in the support member 19, the through hole 40 of the second coupling structure 24 have a polygonal cross-section that is complimentary to the polygonal cross-section of the second portion 56 of the shaft 28 to achieve this non-rotatable connection.

For simplicity and clarity, FIG. 3 only provides a partial view of the second portion 56 of the shaft 28. However, the second portion 56 of the shaft 28 can be dimensioned to extend through both: 1) the entirety of the through hole 40 of the second coupling structure 24, and 2) the through hole of the support member 19 of the arm rest 18. In fact, FIG. 2 shows the second portion 56 of the shaft 28 extending through the through hole of the support member 19 of the arm rest 18. These elements (through hole in the support member 19, through hole 40 of the second coupling structure 24, and second portion 56 of the shaft 28) can be formed so as to define any irregular or polygonal cross-section or shape, such as but not limited to a hexagon, pentagon, rectangle, triangle, octagon, parallelogram, and any irregular polygon, that achieves the non-rotatable connection disclosed above.

Figure 5:
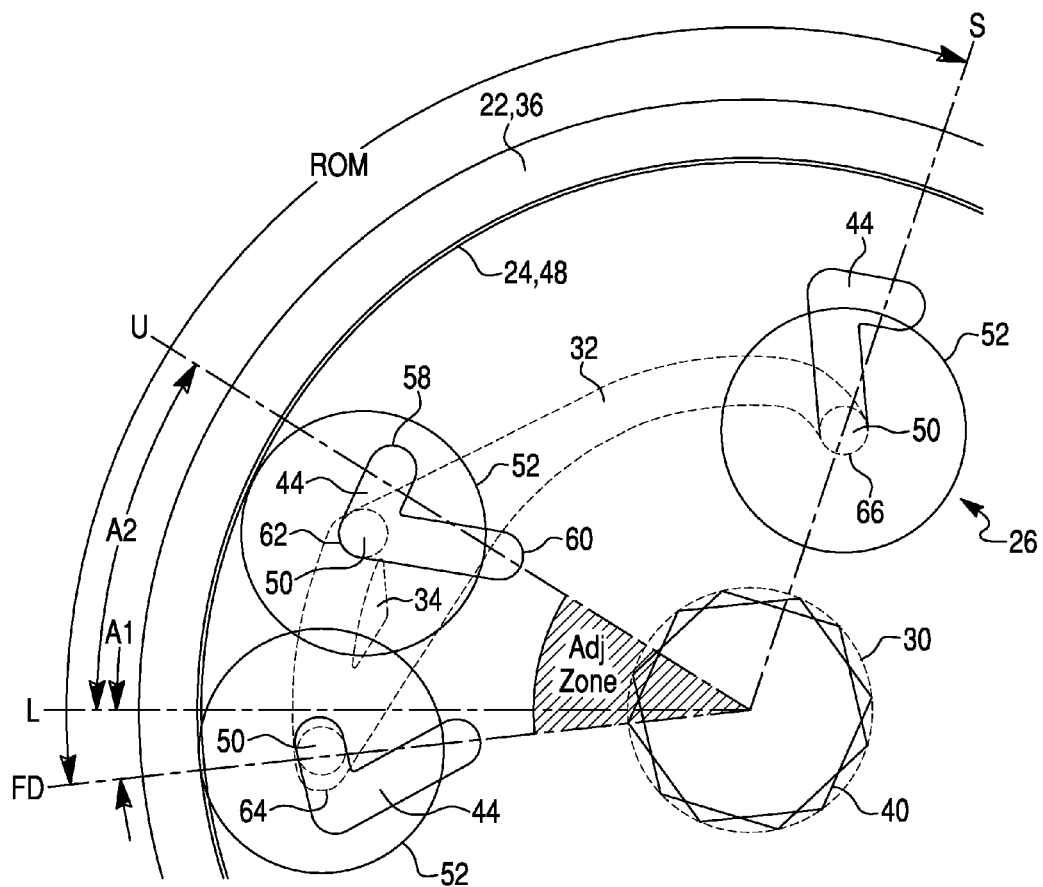
FIG. 5 is a kinematic representation of a full range of motion of the adjustable arm rest mechanism of FIG. 3.

Referring to FIGS. 3 and 5, the second guide structure 44 can be a through hole formed in the recess 42 of the second coupling structure 24. The second guide structure 44 can have a contoured shape of any geometry that can provide the performance desired for the arm rest 18. In the exemplary embodiment of FIGS. 3 and 5, the second guide structure 44 can include a first leg, a second leg, a first end 58, a second end 60 and a common end 62. The first leg can extend from the first end 58 to the common end 62. The second leg can extend from the common end 62 to the second end 60.

In the embodiment shown in FIGS. 3 and 5, the first and second legs form a substantially L-shaped groove, where the second leg is longer than the first leg. In this embodiment, the first and second legs define an acute angle that is slightly less than 90°.

Figure 4:
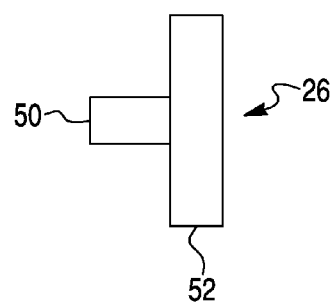
FIG. 4 is a side view of an exemplary lock member of the adjustable arm rest mechanism of FIG. 3.

As shown in FIGS. 3 and 4, the adjustment structure 26 can be in the form of a pin or cylindrical member that includes a friction member 50 and a flange 52. Both the friction member 50 and flange 52 can define circular cross-sections, and the flange 52 can be configured to be disposed within the recess 42 of the second coupling structure 24. In fact, the recess 42 can be configured, such as by a continuous arcuate side wall surface, to guide the movement of the flange 52 within the recess 42.

The friction member 50 can be in the form of a cylindrical projection or pin that extends from the flange 52, such as in a direction perpendicular to front and/or back surfaces thereof. The friction member 50 can have a diameter that is smaller than the diameter of the flange, enabling it to extend through the second guide structure 44 (of the second coupling structure 24) and into the first guide structure 32 (of the first coupling structure 22). The diameter of the friction member 50 can be smaller than the minimum span of the second guide structure 44, enabling the friction member to freely move throughout the second guide structure 44.

In the exemplary embodiment of FIGS. 3 and 4, the friction member 50 is shown as being a cylindrical pin. However, the friction member 50 can have a contoured shape of any geometry that can provide the performance desired for the arm rest 18. In other words, the friction member 50 can have any configuration that enables it to extend into the second guide structure 44 (of the second coupling structure 24) and into the first guide structure 32 (of the first coupling structure 22), to provide the arm rest 18 movement capabilities disclosed herein.

5. Operation

As explained below with reference to FIGS. 6-14, if the second coupling structure 24 rotates relative to the first coupling structure 22, then different portions of the wall surrounding the first guide structure 32 can selectively engage and disengage surfaces of the friction member 50. Simultaneously, different portions of the wall surrounding the second guide structure 44 can selectively engage and disengage surfaces of the friction member 50. This selective engagement and disengagement of the friction member 50 can vary the frictional force between the wall of the first guide structure 32 and the friction member 50. If the frictional force is of a sufficient value, then this frictional force can oppose further pivoting of the arm rest 18 toward the full down position FD, such as between the upper position U and the lower position L, thereby impeding further rotation and in effect locking the arm rest 18 in position.

Figure 6:
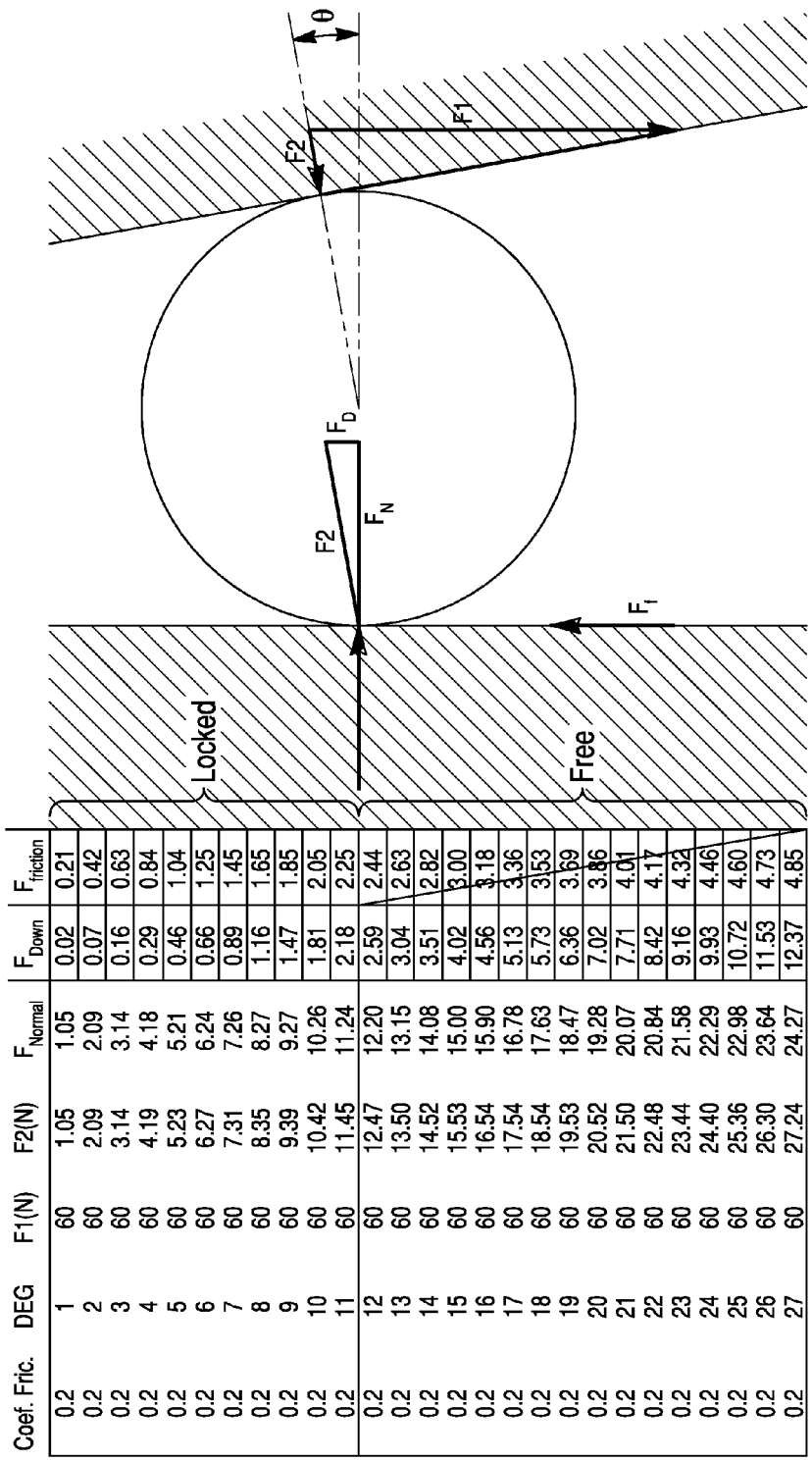
FIG. 6 is a schematic that shows a force diagram and a table of forces for the adjustable arm rest mechanism of FIG. 3.

FIG. 6 is a schematic that shows a force diagram and a table of forces for the adjustable arm rest mechanism 20, and in particular exemplary frictional forces that may be applied by the wall of the first guide structure 32 and the wall of the second guide structure 44 to the friction member 50. As discussed in more detail below, this exemplary configuration of the friction member 50 can enhance the versatility of the arm rest adjustment mechanism 20, while utilizing a relatively simple mechanism that includes a relatively small number of separate parts.

FIG. 6 also includes a table of values for the various forces and values for the angle 8 represented in the force diagram portion of that figure. As indicated in this table, if the angle between opposing portions of the walls of the first and second guide structures 32, 44 is in the range of approximately 1° to 11°, then the magnitude of the frictional force $F_{friction}$ acting between the friction member 50 and the wall of the first guide structure 32 can be sufficient to counter the applied force $F_1$ of approximately 60 N. As a result, the adjustable arm rest mechanism 20 can resist further pivoting motion of the arm rest 18 through the adjustment zone in a direction toward the full down position FD.

As shown in FIGS. 3 and 5, the first guide structure 32 can be configured as a contoured recess formed in the recessed face 38 of the first coupling structure 22. The island structure 34 can extend from the contoured recess and can be spaced from the perimeter wall of the contoured recess, wherein the peripheral wall defines the boundary of the first guide structure.

The perimeter wall of the island structure 34 can cooperate with the perimeter wall of the first guide structure 32 to define a first path 68, a second path 70, a third path 72, a fourth path 74, and a bypass path 76. The first guide structure 32 can include a first end 64 and a second end 66.

The first path 68 can extend from the first end 64 to the second path 70 along an arcuate path. The island structure 34 can extend along at least a portion of the first path 68. The radius of curvature of the first path 68 can be constant or variable. In the exemplary embodiment of FIG. 3, the first path 68 has a constant or substantially constant radius of curvature that is concentric with the annular rim 36. In an alternate embodiment, the first path 68 can have at least one constant radius portion and at least one variable radius portion. The friction member 50 can be disposed on the first path 68 if the arm rest 18 is in the adjustment zone.

The second path 70 can extend from the first path 68 to the third path 72. The second path 70 can include a substantially linear portion and an arcuate portion. The distance between the second path 70 and the portion of the annular rim 36 nearest the second path 70 can increase as the second path 70 extends toward the third path 72. The friction member 50 can be disposed on the second path 70 if the arm rest 18 is in the unrestricted zone.

The third path 72 can extend from the second path 70 to the second end 66 of the first coupling structure 22. The third path 72 can include an arcuate portion configured with a variable radius of curvature. The friction member 50 can be disposed on the third path 72 if the arm rest 18 is adjacent the stowed position S.

The fourth path 74 can extend from an intermediate position of the second path 70 to the first end 64. The fourth path 74 can be substantially linear. The island structure 34 can extend along at least a portion of the fourth path 74 adjacent the first end 64 of the first guide structure 32. The friction member 50 can be disposed on the fourth path 74 if the arm rest 18 is in the unrestricted zone, or if the arm rest 18 is pivoting from the stowed position S to the full down position FD.

The bypass path 76 can extend from a position of the second path 70 that is adjacent to the first path 68 to an intermediate position of the fourth path 74. The island structure 34 can extend along at least a portion of the bypass path 76. The friction member 50 can be disposed on the bypass path 76 if the arm rest 18 is pivoting in the unrestricted zone toward the full down position FD.

Figure 7:
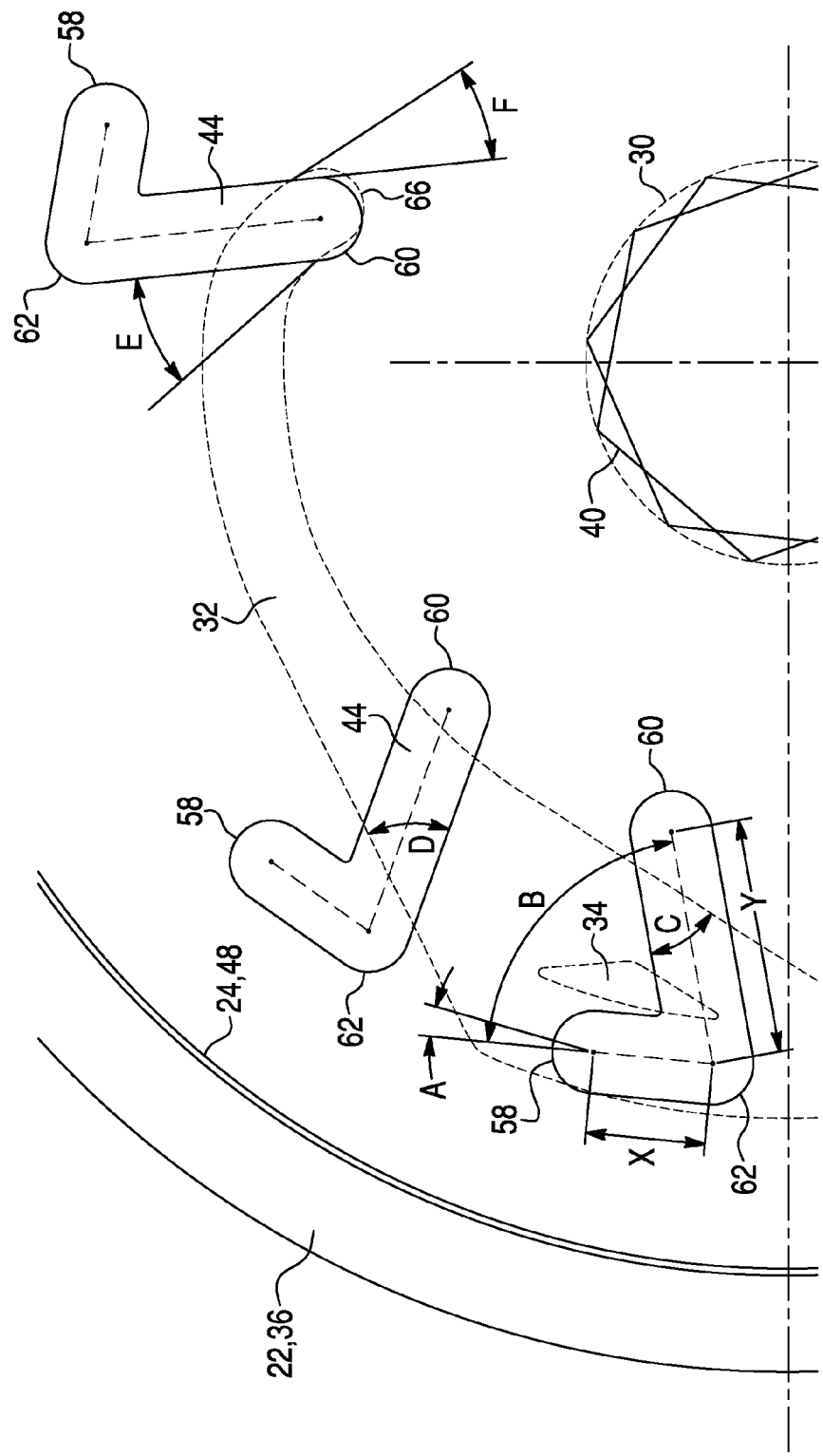
FIG. 7 is a kinematic representation of a portion of the full range of motion of the adjustable arm rest mechanism of FIG. 3, including an adjustment zone, an unrestricted zone and a stowed position.

FIG. 7 is a kinematic representation of a portion of the full range of motion of the adjustable arm rest mechanism of FIG. 3, and in particular illustrates the second coupling structure 24 at various positions along the full range of motion of the adjustable arm rest mechanism 20. The adjustment structure 26 and certain features of the second coupling structure 24 are omitted from FIG. 7 for clarity.

The second guide structure 44 is disposed at a bottom-left position of FIG. 7 if the arm rest 18 is in the adjustment zone. When the second guide structure 44 is at the bottom-left position of FIG. 7, the first leg of the second guide structure 44 extends on the first path 68, and the second leg of the second guide structure 44 extends on the second path 70.

The second guide structure 44 is disposed at a middle position of FIG. 7 if the arm rest 18 is in the unrestricted zone. When the second guide structure 44 is at a middle position of FIG. 7, the first leg of the second guide structure lies beyond the first guide structure 32, and the second leg of the second guide structure 44 extends on the second path 70 and the fourth path 74.

The second guide structure 44 is disposed at a top-right position of FIG. 7 if the arm rest 18 is in the stowed position. When the second guide structure 44 is at the top-right position of FIG. 7, the first leg of the second guide structure lies beyond the first guide structure 32, and the second leg of the second guide structure 44 extends on the third path 72.

FIG. 7 also illustrates the dimensions of the second guide structure 44, as well as various angular relationships of the second guide structure 44 relative to the first guide structure 32. Each of the first end 58, the second end 60 and the common end 62 of the second guide structure 44 can be arcuate, i.e., defining circular or semi-circular surfaces.

The first leg of the second guide structure 44 can include an axis that extends through the centers of curvature of the first end 58 and the common end 62. The second leg of the second guide structure 44 can include an axis that extends through the centers of curvature of the second end 60 and the common end 62. The first leg of the second guide structure 44 can include a first length X measured on the first leg axis from center of curvature to center of curvature. The second leg of the second guide structure 44 can include a second length Y measured on the second leg axis from center of curvature to center of curvature. The first leg axis can intersect the second leg axis at a third angle B. The lengths X, Y and the third angle B can be configured to have any value that can provide the performance desired for the arm rest 18.

A fourth angle A can be defined between the first leg axis of the second guide structure 44 and a line parallel to a tangent line of the perimeter wall of the first guide structure 32, where the friction member 50 engages the perimeter wall of the first guide structure 32 if the arm rest 18 is in the adjustment zone. The fourth angle A can have a value that permits the second guide structure 44 to urge the friction member 50 into engagement with: 1) the perimeter wall of the first leg of the second guide structure 44, and 2) the portion of the perimeter wall of the first guide structure 32 that extends along the first path 68. The fourth angle A can be configured to cause a frictional force, between the friction member 50 and the perimeter wall of the first guide structure 32, to resist motion of the arm rest 18 toward the full down position FD if the arm rest is in the adjustment zone. In an exemplary embodiment, the fourth angle A can include a value that is less than approximately 10°.

A fifth angle C can be defined between the second leg axis of the second guide structure 44 and the perimeter wall of the first guide structure 32, where the friction member 50 engages the perimeter wall of the first guide structure 32 if the arm rest 18 moves into the adjustment zone from the unrestricted zone. The fifth angle C can have a value that permits the friction member 50 to engage: 1) the perimeter wall along the second leg of the second guide structure 44, and 2) a portion of the perimeter wall of the first guide structure 32 that extends along the fourth path 74. The fifth angle C can be configured to not interfere with the pivoting motion of the arm rest 18. In an exemplary embodiment, the fifth angle C can have a value that is greater than approximately 45°.

A sixth angle D can be defined between the first leg axis of the second guide structure 44 and the perimeter wall of the first guide structure 32, where the friction member 50 disengages the perimeter wall of the first guide structure 32 if the arm rest 18 moves in the unrestricted zone. The sixth angle D can be configured to permit the arm rest 18 to pivot within the unrestricted zone without interference by the adjustable arm rest mechanism 20. In an exemplary embodiment, the sixth angle D can have a value that is greater than approximately 40°.

A seventh angle E can be defined between the second leg axis of the second guide structure 44 and a line parallel to a tangent line of the perimeter wall of the first guide structure 32, where the friction member 50 engages the perimeter wall of the first guide structure 32 if the arm rest 18 is in the stowed position. The seventh angle E can have a value that permits the friction member 50 to engage: 1) the perimeter wall along the second leg of the second guide structure 44, and 2) a portion of the perimeter wall of the first guide structure 32 that lies adjacent the second end 66 of the first guide structure 32. The seventh angle E can be configured to cause a frictional force between the friction member 50 and the perimeter wall of the first guide structure 32 that can permit movement of the arm rest 18 out of the stowed position S, while simultaneously providing light resistance to provide the seat occupant with a tactile sensation that the arm rest 18 is being released from the stowed position S. In an exemplary embodiment, the seventh angle E can have a value that is greater than approximately 20°.

An eighth angle F can be defined between the second leg axis of the second guide structure 44 and a line parallel to a tangent line of the perimeter wall of the first guide structure 32, where the friction member 50 engages the perimeter wall of the first guide structure 32 if the arm rest 18 is in the stowed position. The eighth angle F can have a value that permits the friction member 50 to engage: 1) the perimeter wall along the second leg of the second guide structure 44, and 2) a portion of the perimeter wall of the first guide structure 32 that lies adjacent the second end 66 of the first guide structure 32. The eighth angle F can be configured to cause a frictional force between the friction member 50 and the perimeter wall of the first guide structure 32, which can secure the arm rest 18 in the stowed position S. In an exemplary embodiment, the eighth angle F can have a value that is greater than approximately 20°.

The operation of the arm rest 18 is discussed below in the context of FIGS. 8-14. Certain features of the second coupling structure 24 have been omitted from FIGS. 8-14 for clarity.

Figure 8:
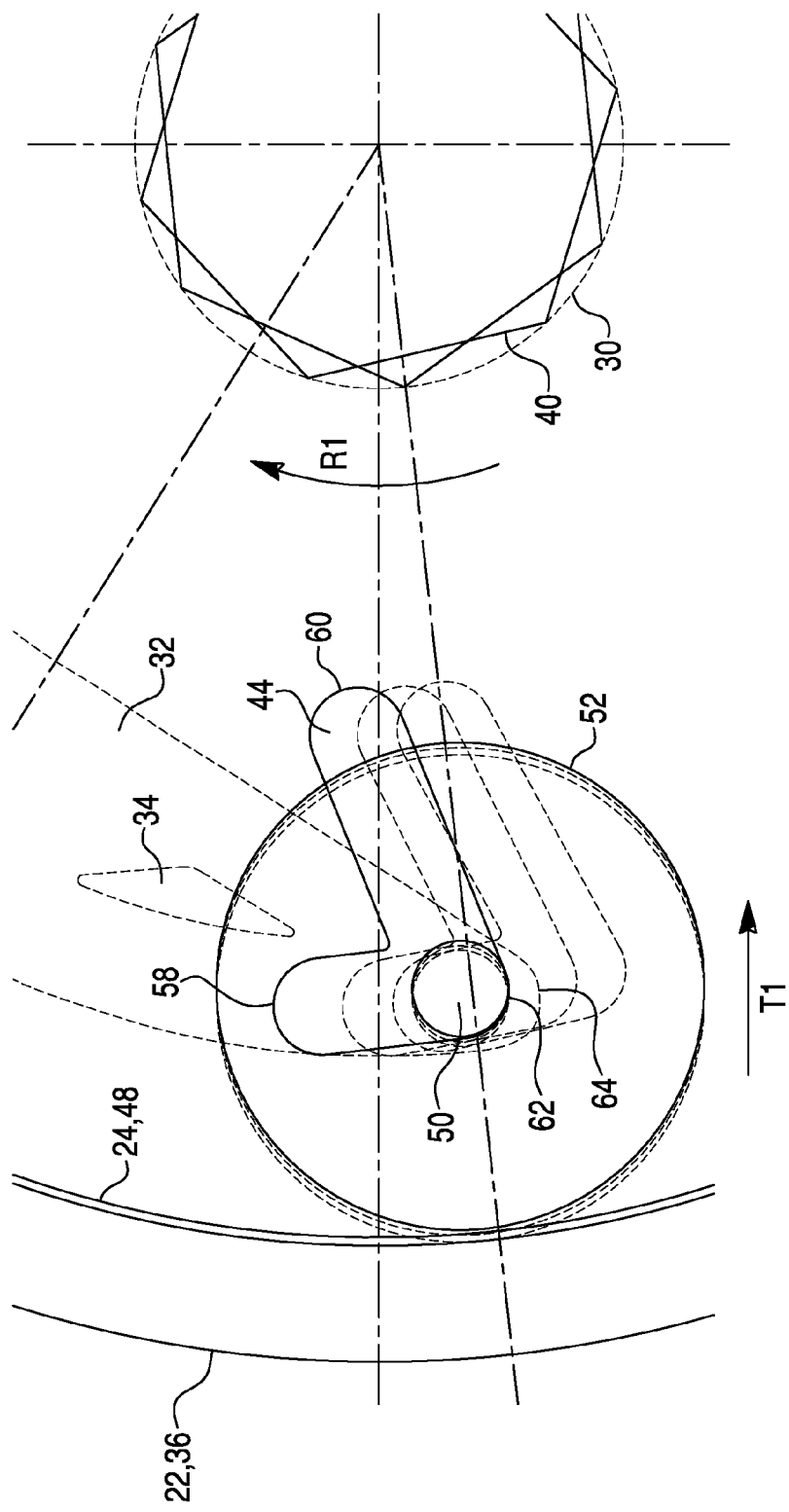
FIG. 8 is a kinematic representation of a portion of the full range of motion of the adjustable arm rest mechanism of FIG. 3, including movement within the adjustment zone.

FIG. 8 is a kinematic representation of a portion of the full range of motion of the adjustable arm rest mechanism of FIG. 3, and in particular movement of the second coupling structure 24 and the adjustment structure 26 when the arm rest 18 pivots from the full down position FD toward the upper position U. The left-most phantom view of the friction member 50 and the bottom-most phantom view of the second guide structure 44 depict the positions of the friction member 50 and the second guide structure 44 on the first path 68 when the arm rest 18 is in the full down position FD. Here, the first leg perimeter wall of second guide structure 44 can cause the friction member 50 to frictionally engage the perimeter wall of the first guide structure 32. At this location, the value of the fourth angle A can provide a frictional force that can sufficiently resist further motion of the arm rest 18 toward the full down position FD.

The friction member 50 can be spaced from the first end of the first guide structure 32 when the arm rest is in the full down position FD. Also at this location, a portion of the first leg and a portion of the common end 62 of the second guide structure 44 lie beyond the perimeter wall of the first guide structure 32. The common end 62 of the second guide structure 44 can provide a hard stop for the arm rest 18 that can limit further motion of the arm rest 18.

As the arm rest 18 pivots from the full down position FD toward the upper position U, the second coupling structure 24 rotates in the first direction R1. This rotation can cause the second guide structure 44 to engage the friction member 50 from the left in the context of FIG. 8. As a result, the second guide structure 44 can displace the friction member 50 in the second direction T2 (See FIG. 9) and out of engagement with the perimeter wall of the first guide structure 32, thereby removing the frictional force between the friction member 50 and the perimeter wall of the first guide structure 32. After further rotation in the first direction R1, the common end 62 of the second guide structure 44 is able to receive the friction member 50.

Figure 9:
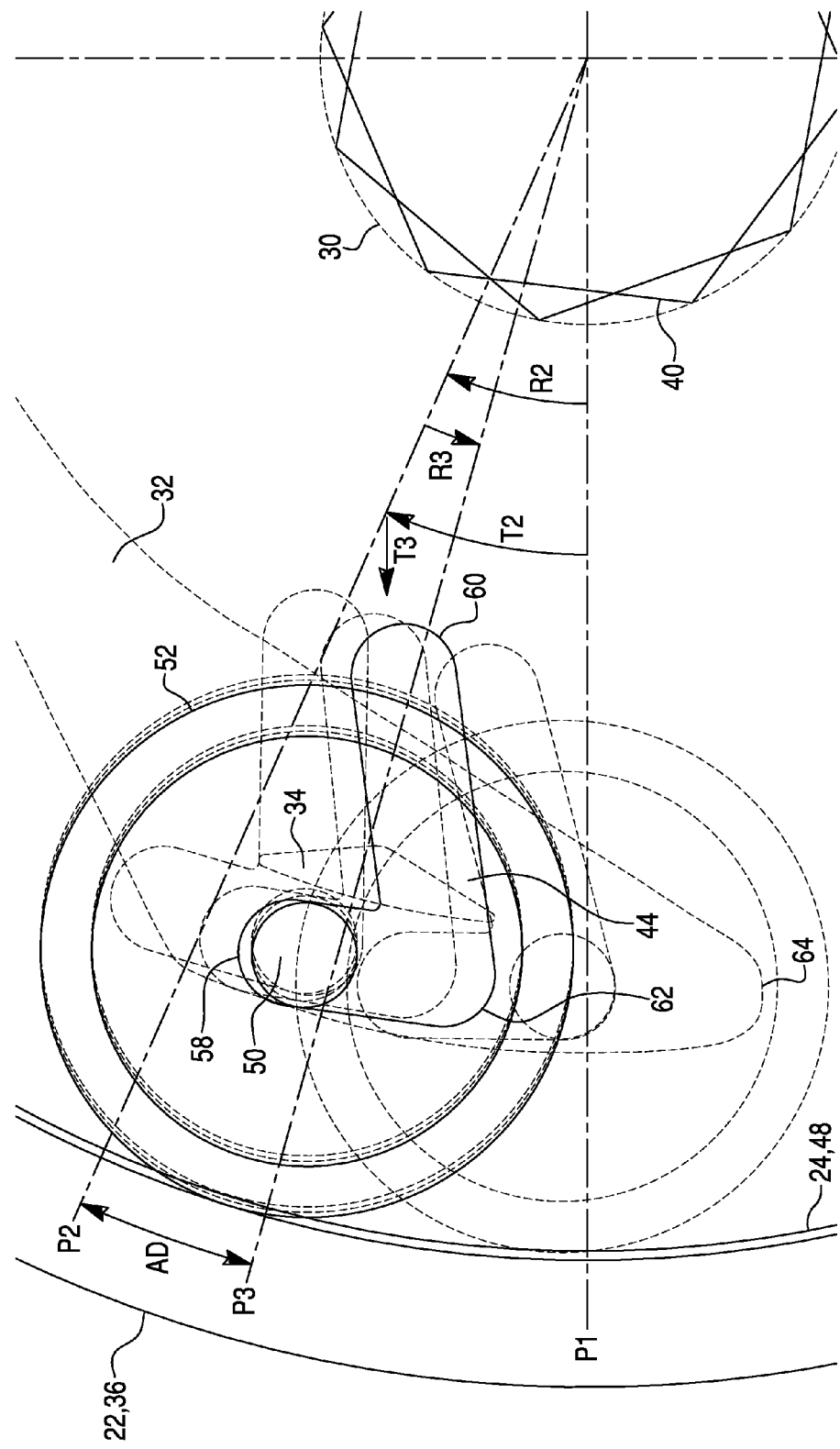
FIG. 9 is a kinematic representation of a portion of the full range of motion of the adjustable arm rest mechanism of FIG. 3, including further movement within the adjustment zone.

FIG. 9 is a kinematic representation of a portion of the full range of motion of the adjustable arm rest mechanism of FIG. 3, and in particular shows movement of the second coupling structure 24 and the adjustment structure 26 when the arm rest 18 pivots further through the adjustment zone toward the upper position U. The second coupling structure 24 can rotate in the third direction R2. This rotation can cause the second guide structure 44 to displace the friction member 50 along the first path 68 in the fourth direction T2 until the friction member 50 reaches the first position P2. During rotation in the third direction R2, the friction member 50 can be located in the common end 62. Thus, the second guide member 50 can maintain the friction member 50 in a position spaced from the perimeter wall of the first guide structure 32. FIG. 9 depicts this movement of the second guide structure 44 and the friction member 50 in phantom. The first position P2 can correspond to the upper position U.

If the arm rest 18 pivots towards the full down position FD while in the adjustment zone, the second coupling structure 24 can rotate in the fifth direction R3. This rotation can cause friction member 50 to exit the common end 62 of the second guide structure 44. Rotation in the fifth direction R3 can cause the first leg of the second guide structure 44 to engage the friction member 50 at a second position P3. Once engaged, the first leg of the second guide structure 44 can displace the friction member in the sixth direction T3 so that the friction member 50 frictionally engages the perimeter wall of the first guide structure 32, as depicted in solid lines. As a result, the stop point of the arm rest 18 in the adjustment zone is set.

Figure 10:
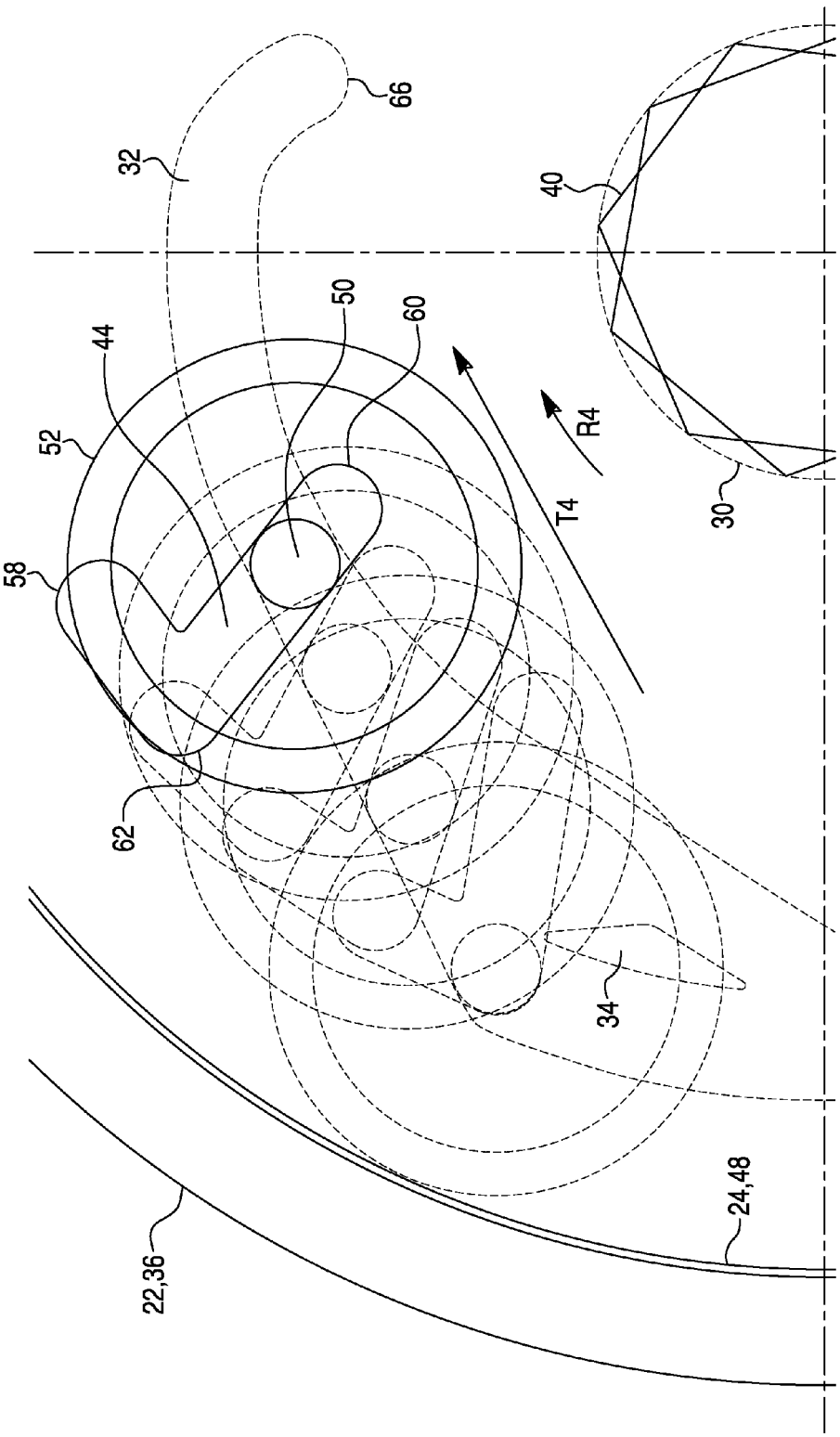
FIG. 10 is a kinematic representation of a portion of the full range of motion of the adjustable arm rest mechanism of FIG. 3, including movement within the unrestricted zone.

FIG. 10 is a kinematic representation of a portion of the full range of motion of the adjustable arm rest mechanism of FIG. 3, and in particular shows movement of the second coupling structure 24 and the adjustment structure 26 when the arm rest 18 pivots through the unrestricted zone toward the stowed positions. The second coupling structure 24 can rotate in the seventh direction R4. This rotation can cause the second guide structure 44 to displace the friction member 50 along the second path 70 in the eighth direction T4. This rotation can orient the second guide structure 44 relative to the perimeter wall of the first guide structure 32 and the friction member 50, so that the second guide structure 44 imparts a small or negligible frictional force between the friction member 50 and the perimeter wall of the first guide structure 32. This orientation can cause the second guide structure 44 to guide the friction member 50 into the second leg of the second guide structure 44.

Figure 11:
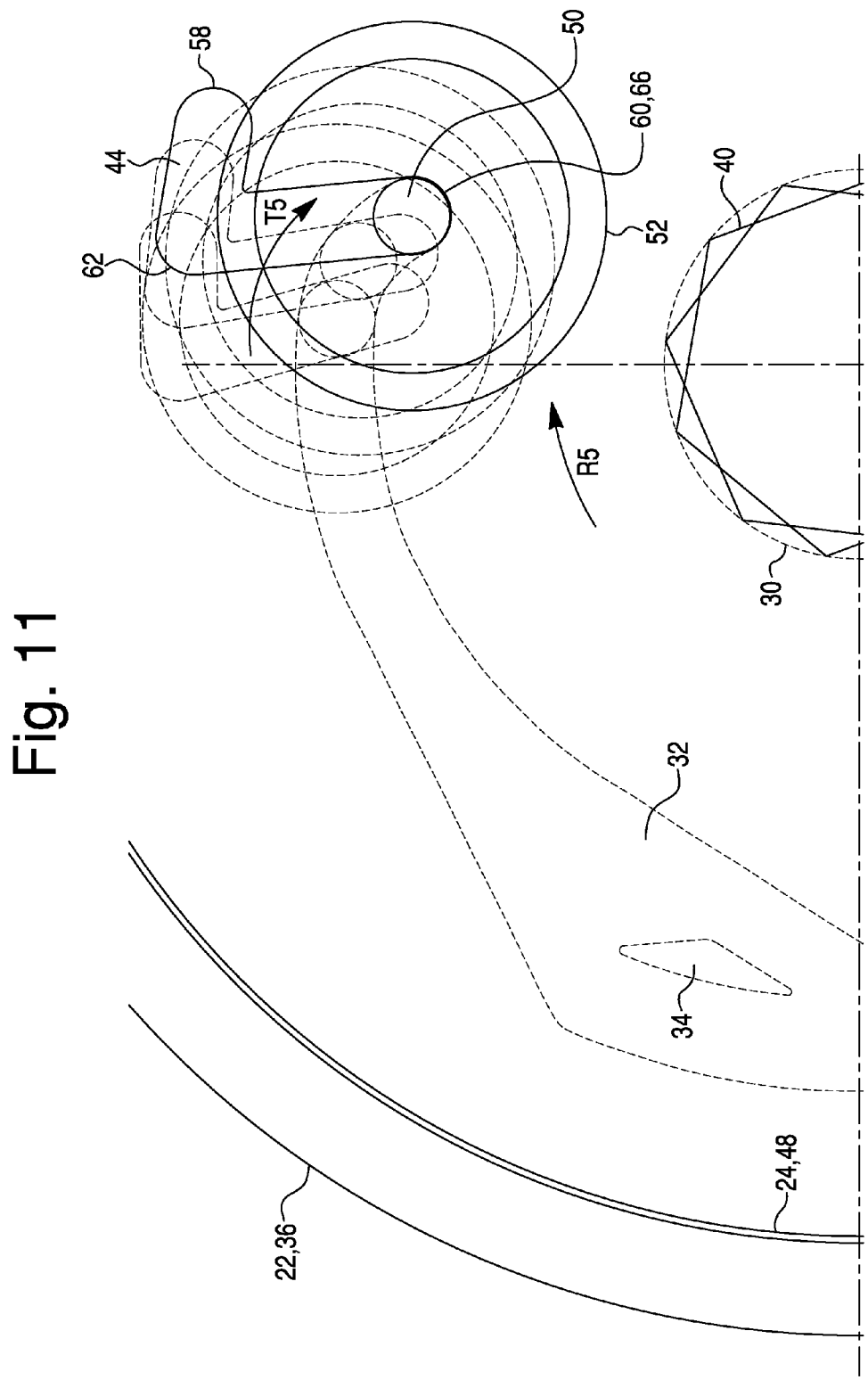
FIG. 11 is a kinematic representation of a portion of the full range of motion of the adjustable arm rest mechanism of FIG. 3, including movement into a stowed position.

FIG. 11 is a kinematic representation of a portion of the full range of motion of the adjustable arm rest mechanism of FIG. 3, and in particular shows movement of the second coupling structure 24 and the adjustment structure 26 when the arm rest 18 pivots into the stowed position S. The second coupling structure 24 can rotate in the ninth direction R5. This rotation can cause the second guide structure 44 to displace the friction member 50 along the third path 72 in the tenth direction T5. This rotation can cause the second guide structure 44 to urge the friction member 50 into engagement with the second end 60 of the second guide structure 44 and into engagement with the second end 66 of the first guide structure 32. When the friction member 50 is at the second end 66 of the first guide structure 32, the arm rest 18 is in the stowed position S.

Figure 12:
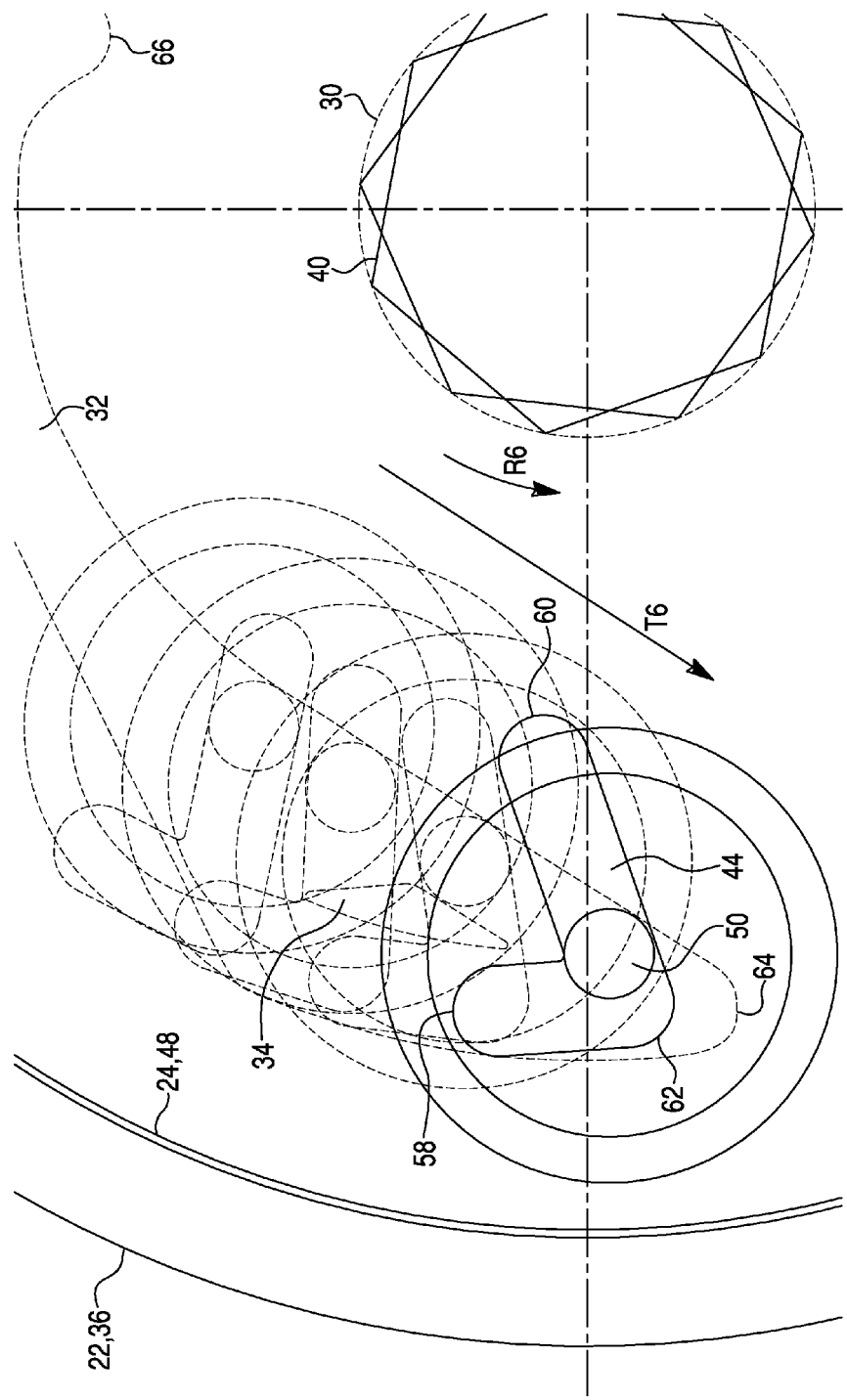
FIG. 12 is a kinematic representation of a portion of the full range of motion of the adjustable arm rest mechanism of FIG. 3, including movement from the stowed position toward a full down position.

FIG. 12 is a kinematic representation of a portion of the full range of motion of the adjustable arm rest mechanism of FIG. 3, and in particular shows movement of the second coupling structure 24 and the adjustment structure 26, when the arm rest 18 pivots from the unrestricted zone or the stowed position S toward the full down position FD. The second coupling structure 24 can rotate in the eleventh direction R6. This rotation can cause the second guide structure 44 to displace the friction member 50 along the fourth path 74 in the twelfth direction T6. This rotation can cause the second guide structure 44 to guide the friction member 50 along the second leg of the second guide structure 44 toward the common end 62 and into engagement with the perimeter wall of the first guide structure 32. This rotation can orient the second guide structure 44 relative to the perimeter wall of the first guide structure 32 and the friction member 50, so that the second guide structure 44 imparts a small or negligible frictional force between the friction member 50 and the perimeter wall of the first guide structure 32.

FIG. 13 is a kinematic representation of a portion of the full range of motion of the adjustable arm rest mechanism of FIG. 3, and in particular shows movement of the second coupling structure 24 and the adjustment structure 26, when the arm rest 18 pivots from the unrestricted zone or the stowed position S and into the full down position FD. The second coupling structure 24 can rotate in the thirteenth direction R7. This rotation can cause the second guide structure 44 to displace the friction member 50 further along the fourth path 74 in the fourteenth direction T7. This rotation can cause the second guide structure 44 to guide the friction member 50 into the first leg of the second guide structure 44 in the sixteenth direction T8, toward the common end 62 and into engagement with the perimeter wall of the first guide structure 32. This rotation can orient the second guide structure 44 relative to the perimeter wall of the first guide structure 32 and the friction member 50, so that second guide structure 44 imparts a friction force, between the friction member 50 and the perimeter wall of the first guide structure 32, that is sufficient to resist further pivoting of the arm rest 18 toward the full down position FD, as explained above with reference to FIG. 8.

FIG. 14 is a kinematic representation of a portion of the full range of motion of the adjustable arm rest mechanism of FIG. 3, and in particular shows movement of the second coupling structure 24 and the adjustment structure 26, when the arm rest 18 pivots from the unrestricted zone toward the full down position FD without reaching the stowed position S. The second coupling structure 24 can rotate in the fifteenth direction R8. This rotation can cause the second guide structure 44 to displace the friction member 50 along the bypass path 76 in the seventeenth direction T9. This rotation can cause the second guide structure 44 to guide the friction member 50 along the second leg of the second guide structure 44 toward the second end 60 and into engagement with the perimeter wall of the island structure 34. This rotation can orient the second guide structure 44 relative to the perimeter wall of the first guide structure 32 and the friction member 50, so that second guide structure imparts a small or negligible friction force between the friction member 50 and the perimeter wall of the first guide structure 32.

6. Alternative Embodiments

While certain embodiments of the invention are described above, and FIGS. 1-14 disclose the best mode for practicing the various inventive aspects, it should be understood that the invention can be embodied and configured in many different ways without departing from the spirit and scope of the invention.

For example, embodiments are disclosed above in the context of the vehicle seat shown in FIG. 1. However, embodiments are intended to include or otherwise cover any type of seat that can be used with elements of the adjustable arm rest mechanism 20 disclosed above. For example, the seat back 12 can be pivotally connected to the seat bottom 14. The head rest 16 can be movably connected to the seat back 12. In an alternate embodiment, the head rest 16 can be rigidly fixed to the seat back 12. In another alternate embodiment, the head rest 16 can be integrally formed with the seat back 12. However, the above alternative embodiments are merely provided for exemplary purposes, and as indicated above, embodiments are intended to cover any type of seat that can be used with elements of the adjustable arm rest mechanism 20 disclosed above.

Exemplary embodiments are intended to include or otherwise cover any type of arm rest, whether mounted on a seat, at a structure adjacent the seat, or even at a structure unrelated to a seat but disposed to support an arm of a user who is not seated, e.g., standing or lying down. In other words, exemplary embodiments are intended to cover any application of the adjustable arm rest mechanism disclosed above.

Exemplary embodiments are also intended to cover any appropriate geometry of first and second guide structures 32, 44 that can cause the adjustment structure 26 to impede or prevent the arm rest 18 from moving from the desired stop position toward the full down position FD. Exemplary embodiments are further intended to cover omission of the bypass path 76 of the first guide structure is 32, such as but not limited to extensions of the island structure 34 as a replacement. Exemplary embodiments are further intended to cover any connection that can rotationally lock the shaft 28 to the support member 19 and to the second coupling structure 24.

Embodiments are disclosed above in the context of a manually adjustable arm rest mechanism. However, embodiments are intended to cover automatically adjustable arm rest mechanisms, including mechanisms that use or otherwise include motors, processors, etc.

Embodiments are also intended to include or otherwise cover methods of using and methods of manufacturing the adjustable arm rest mechanism disclosed above. The methods of manufacturing include or otherwise cover processors and computer programs implemented by processors used to design various elements of the adjustable arm rest mechanism disclosed above. For example, embodiments are intended to cover processors and computer programs used to design or determine the appropriate geometries of the first and second guide structures 32, 44 that can cause the adjustment structure 26 to impede or prevent the arm rest 18 from moving from the desired stop position toward the full down position FD.

For example, exemplary embodiments are intended to cover all software or computer programs capable of enabling processors to implement the above designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data, Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. An adjustable arm rest attachment mechanism for use with a seat and an arm rest that is configured to support an arm of an occupant of the seat in a position within an adjustment zone, the seat including a seat frame and the arm rest including an arm rest support member, the adjustable arm rest attachment mechanism comprising:
   an outer bearing that is non-rotatably fixed to the seat frame and that defines a first guide groove;
   an inner bearing that is non-rotatably fixed to the arm rest support member and that defines a second guide groove, the inner bearing being rotatable relative to the outer bearing and being disposed over the outer bearing such that at least a portion of the second guide groove overlaps at least a portion of the first guide groove; and
   a pin that extends through the second guide groove and into the first guide groove, the pin and the first and second guide grooves being configured such that, if the arm rest is rotated downward in the adjustment zone, then wall surfaces of the first guide groove selectively engage and disengage the pin, and simultaneously, wall surfaces of the second guide groove selectively engage and disengage the pin, thereby creating a varying frictional force capable of impeding further rotation of the arm rest.

2. The adjustable arm rest attachment mechanism according to claim 1, wherein the outer and inner bearings and the pin enable the arm rest to be manually rotatable relative to the seat occupant between a full down position within the adjustment zone in which the arm rest is disposed to support the arm of the seat occupant, and a stowed position in which the arm rest is not disposed to support the arm of the occupant.

3. The adjustable arm rest attachment mechanism according to claim 2, wherein the arm rest defines an angle of at least 90° with the seat frame in at least one arm rest position within the adjustment zone, and the arm rest is substantially parallel to the seat frame in the stowed position.

4. The adjustable arm rest attachment mechanism according to claim 1, wherein the arm rest is infinitely variable between certain positions within the adjustment zone, including an upper position, a lower position, and a full down position that defines the maximum angle between the arm rest and the seat frame, the pin cooperating with the first and second guide grooves to enable the arm rest to be locked at any position between the upper and lower positions as the arm rest is rotated toward the full down position, the pin cooperating with the first and second guide grooves to enable the arm rest to not be locked at any position between the lower and full down positions, the arm rest defining a first angle between the lower position and the full down position and a second angle between the lower position and the upper position, the first angle being smaller than the second angle.

5. The adjustable arm rest attachment mechanism according to claim 1, further comprising a shaft defining a polygonal cross-section, wherein the inner bearing and arm rest support member each define polygonal shaped recesses that correspond to the polygonal cross-section of the shaft to non-rotatably connect the shaft to the inner bearing and the arm rest support member.

6. The adjustable arm rest attachment mechanism according to claim 1, wherein the outer bearing defines a recessed face circumscribed by an annular rim, the inner bearing being configured to be disposed over the recessed face and within the annular rim, such that the inner bearing is rotatable relative to the outer bearing.

7. The adjustable arm rest attachment mechanism according to claim 1, wherein the inner bearing defines a recess with a continuous arcuate sidewall surface, the pin including a flange and a cylindrical projection with a cross-section that is smaller than a cross-section of the flange, the flange being configured to be disposed within the recess enabling the cylindrical projection to extend within the first and second guide grooves.

8. The adjustable arm rest attachment mechanism according to claim 7, wherein the second guide groove is defined within the recess and constitutes a generally L-shaped opening that extends through the inner bearing, the L-shaped opening including two separate legs that define an acute angle therebetween.

9. The adjustable arm rest attachment mechanism according to claim 8, wherein the first guide groove constitutes an elongated groove defined by sidewalls and having first and second ends, the second end being wider than the first end and including a projection spaced from the sidewalls, side surfaces of the projection and the sidewalls of the first guide groove defining multiple paths through which the pin may travel.

10. The adjustable arm rest attachment mechanism according to claim 9, wherein the sidewalls of the first guide groove define both linear and arcuate portions extending between the first and second ends, such that a distance separating the sidewalls from the outer perimeter of the outer bearing increases from the mid-point of the first guide groove toward the first end.

11. A seat for use with a vehicle and a seat occupant, comprising:
   a seat frame;
   an arm rest that is configured to support an arm of the seat occupant in a position within an adjustment zone, the arm rest including an arm rest support member; and
   an adjustable arm rest attachment mechanism that includes:
      an outer bearing that is non-rotatably fixed to the seat frame and that defines a first guide groove;
      an inner bearing that is non-rotatably fixed to the arm rest support member and that defines a second guide groove, the inner bearing being rotatable relative to the outer bearing and being disposed over the outer bearing such that at least a portion of the second groove overlaps at least a portion of the first groove; and
      a pin that extends through the second guide groove and into the first guide groove, the pin and the first and second guide grooves being configured such that, if the arm rest is rotated downward in the adjustment zone, then wall surfaces of the first guide groove selectively engage and disengage the pin, and simultaneously, wall surfaces of the second guide groove selectively engage and disengage the pin, thereby creating a varying frictional force capable of impeding further rotation of the arm rest.

12. The seat according to claim 11, wherein the outer and inner bearings and the pin enable the arm rest to be manually rotatable relative to the seat occupant between a full down position within the adjustment zone in which the arm rest is disposed to support the arm of the seat occupant, and a stowed position in which the arm rest is not disposed to support the arm of the occupant.

13. The seat according to claim 12, wherein the arm rest defines an angle of at least 90° with the seat frame in at least one arm rest position within the adjustment zone, and the arm rest is substantially parallel to the seat frame in the stowed position.

14. The seat according to claim 11, wherein the arm rest is infinitely variable between certain positions within the adjustment zone, including an upper position, a lower position, and a full down position that defines the maximum angle between the arm rest and the seat frame, the pin cooperating with the first and second guide grooves to enable the arm rest to be locked at any position between the upper and lower positions as the arm rest is rotated toward the full down position, the pin cooperating with the first and second guide grooves to enable the arm rest to not be locked at any position between the lower and full down positions, the arm rest defining a first angle between the lower position and the full down position and a second angle between the lower position and the upper position, the first angle being smaller than the second angle.

15. The seat according to claim 11, further comprising a shaft defining a polygonal cross-section, wherein the inner bearing and arm rest support member each define polygonal shaped recesses that correspond to the polygonal cross-section of the shaft to non-rotatably connect the shaft to the inner bearing and the arm rest support member.

16. The seat according to claim 11, wherein the outer bearing defines a recessed face circumscribed by an annular rim, the inner bearing being configured to be disposed over the recessed face and within the annular rim, such that the inner bearing is rotatable relative to the outer bearing.

17. The seat according to claim 11, wherein the inner bearing defines a recess with a continuous arcuate sidewall surface, the pin including a flange and a cylindrical projection with a cross-section that is smaller than a cross-section of the flange, the flange being configured to be disposed within the recess enabling the cylindrical projection to extend within the first and second guide grooves.

18. The seat according to claim 17, wherein the second guide groove is defined within the recess and constitutes a generally L-shaped opening that extends through the inner bearing, the L-shaped opening including two separate legs that define an acute angle therebetween.

19. The seat according to claim 18, wherein the first guide groove constitutes an elongated groove defined by sidewalls and having first and second ends, the second end being wider than the first end and including a projection spaced from the sidewalls, side surfaces of the projection and the sidewalls of the first guide groove defining multiple paths through which the pin may travel; and wherein the sidewalls of the first guide groove define both linear and arcuate portions extending between the first and second ends, such that a distance separating the sidewalls from the outer perimeter of the outer bearing increases from the mid-point of the first guide groove toward the first end.

20. A method of manufacturing an adjustable arm rest attachment mechanism for use with a seat and an arm rest that is configured to support an arm of an occupant of the seat in a position within an adjustment zone, the seat including a seat frame and the arm rest including an arm rest support member, the method comprising:

non-rotatably fixing an outer bearing to the seat frame;

defining a first guide groove in the outer bearing;

non-rotatably fixing an inner bearing to the arm rest support member;

defining a second guide groove in the inner bearing;

disposing the inner bearing over the outer bearing such that: the inner bearing is rotatable relative to the outer bearing, and at least a portion of the second guide groove overlaps at least a portion of the first guide groove;

extending a pin through the second guide groove and into the first guide groove; and configuring the pin and the first and second guide grooves such that, if the arm rest is rotated downward in the adjustment zone, then wall surfaces of the first guide groove selectively engage and disengage the pin, and simultaneously, wall surfaces of the second guide groove selectively engage and disengage the pin, thereby creating a varying frictional force capable of impeding further rotation of the arm rest.

* * * * *